FIP8106 OR 3,566,126

[11] 3,566,126

[72] Inventors Kenneth T. Lang Needham; Robert F. Lucy, Andover; Gerard H. Ratcliffe, Boston, Mass.

[21] Appl. No. 686,471

[22] Filed Nov. 29, 1967

[45] Patented Feb. 23, 1971

[73] Assignee Sylvania Electric Products Inc.

[54] ACQUISTION AND TRACKING LASER COMMUNICATION SYSTEM
7 Claims, 7 Drawing Figs.

[52] U.S. Cl. .......... 250/199

[51] Int. Cl. .......... H04b 9/00

[50] Field of Search .......... 325/3, 15 (SAT); 343/7.4, 100 (SAT); 178/7.6; 250/199

[56] References Cited

UNITED STATES PATENTS

| | | | |
|---|---|---|---|
| 2,345,445 | 3/1944 | Atwood | 250/199 |
| 3,290,503 | 12/1966 | Staufenberg | 250/199 |
| 3,465,156 | 9/1969 | Peters | 250/199 |

OTHER REFERENCES

H. Stockman, Communications by Means of Reflected Power, Proceedings of the IRE, Oct. 1948, pp.1196— 1204, Class 250— 199 R. E. Tibbetts, IBM Tech Disclosure Bulletin, Simplified Optical Unit for Page Scanner, V8, N6, Nov. 1965, p. 885, Class 178— 7.6

*Primary Examiner*—Richard Murray
*Assistant Examiner*—Albert J. Mayer
*Attorneys*—Norman J. O'Malley, Elmer J. Nealon and David M. Keay

ABSTRACT: A laser communication system employing first and second transmitter-receiver terminals wherein each terminal includes a single beam steering element to simultaneously control both the transmitted and received signals while maintaining a high degree of isolation between the two signals.

INVENTORS
KENNETH T. LANG
ROBERT F. LUCY
GERARD H. RATCLIFFE
BY David M. Kay AGENT INVENTORS
KENNETH T. LANG
ROBERT F. LUCY
GERARD H. RATCLIFFE
BY
David M. Kay AGENT INVENTORS
KENNETH T. LANG
ROBERT F. LUCY
GERARD H. RATCLIFFE
BY David M. Keay AGENT INVENTORS
KENNETH T. LANG
ROBERT F. LUCY
GERARD H. RATCLIFFE
BY David M. Kaay AGENT

ACQUISTION AND TRACKING LASER COMMUNICATION SYSTEM

BACKGROUND OF THE INVENTION

The invention relates to communications systems, and in particular to laser communications systems.

In conventional laser communications systems having a pair of transmitter-receiver terminals, a large, steerable plane mirror is employed to receive a light signal and direct it to optics where the signal is magnified for subsequent signal processing. Such steerable mirrors, which, it will be appreciated, function in a similar manner to antennas in radio frequency systems, generally have large mass and require a servocontrol system of commensurate size and capacity to suitably steer the mirror. Conventional systems, therefore, are not easily portable. Another disadvantage in present laser communications systems is the manner in which isolation is achieved between the transmitter and receiver of a communications terminal. Aperture blocks are generally employed between the steering mirror and the magnifying optics to isolate the receiver of a communications terminal from the transmitter of the same terminal; however, isolation is accomplished at the expense of useable received energy, since these aperture blocks substantially reduce the amount of light transferred from the steering mirror to a detector.

It would be advantageous to have and it is an object of the subject invention to provide a portable laser communication system having a small size low mass beam steering element not only to provide simultaneous control of the transmitted and received beams but also to maintain the requisite isolation for simultaneous transmission and reception of messages.

SUMMARY OF THE INVENTION

Briefly, the laser communication system according to the present invention employs first and second terminals, remotely located with respect to each other. Each terminal includes a transmitter to generate a modulated light beam, a beam steering means to simultaneously control the transmitted modulated light beam and a light beam received from the companion terminal, a set of directing optics to direct respective received and transmitted light beams to and from the beam steering means, an optical receiver to detect and demodulate the received beam, and a tracking means to control the beam steering means such that the output of the optical receiver is a maximum.

As a feature of the invention, a two-sided mirror is employed as a beam steering element in the beam steering means and is located at a position in the light transmission path to receive light after it is magnified by the magnifying optics. Simultaneous receiver and transmitter operation is achieved because of the isolation obtained in using one side of the steering mirror to direct the transmitter beam and the other side to direct the receiver beam after passing through the directing optics. By placing the steering mirror behind the receiver magnifying optics, where the diameter of the received beam is narrow, a much smaller mirror compared with those of the prior art is employed thus reducing the size of the servo system necessary to position the mirror typically by a factor of 100.

BRIEF DESCRIPTION OF THE DRAWINGS

The invention will be more fully understood from the following detailed description, taken in conjunction with the accompanying drawings in which.

DETAILED DESCRIPTION OF THE INVENTION

System Description

Figure 1:
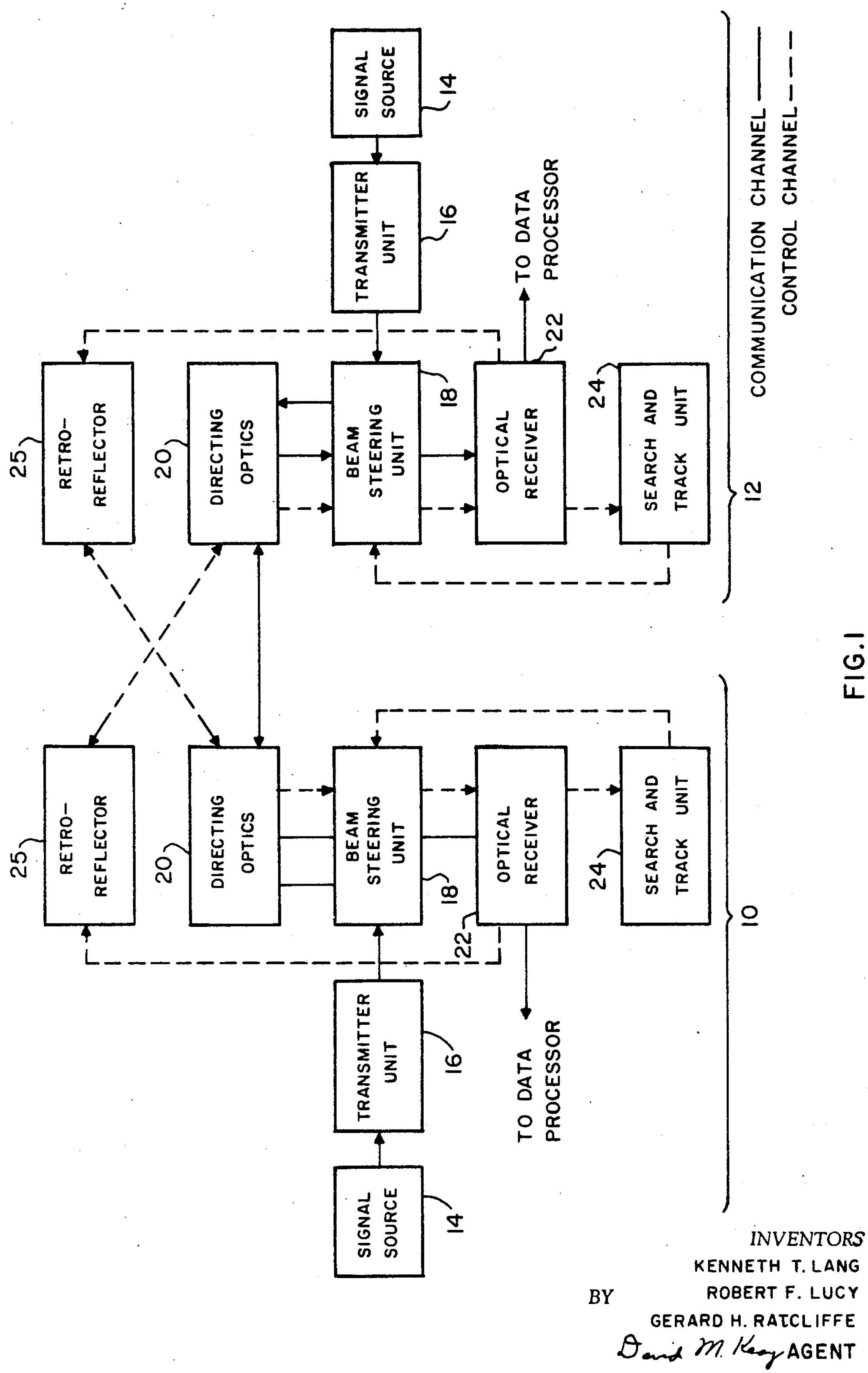
FIG. 1 is a block diagram of a laser communication system embodying the invention.

Referring to FIG. 1, a laser communication system according to the invention employs two terminals 10 and 12 each including a signal source 14 containing the information to be communicated; a transmitter unit 16 typically a laser modulator; a beam steering unit 18 including a two-sided mirror; directing optics 20 typically a plurality of mirrors for directing the transmitted beam and Schmidt-Cassagrain collecting optics for collecting an incoming signal; and optical receiver 22 typically an optical-electric conversion unit to demodulate the optical carrier and obtain the desired information signal; a search/track unit 24; and a retroreflector 25 typically a corner reflector and shutter. While FIG. 1 shows two identical terminals, any remote terminal capable of receiving and transmitting light can be employed with a single terminal of the subject invention.

In operation a message from signal source 14 of terminal 10 is impressed on a laser beam by transmitter unit 16 prior to being transferred through the directing optics 20 via one side of the beam steering unit 18. The modulated signal from terminal 10 is then received by the directing optics 20 of terminal 12, transferred via the receiver side of beam steering unit 18 to the optical receiver 22 for demodulation. A portion of the received signal is directed to the search and track unit 24 which then furnishes a control signal to the beam steering unit 18 to insure that terminal 12 is pointing at the remote terminal 10.

In the absence of data transmitted from terminal 10, a portion of the transmitted energy from terminal 12 is reflected from the retroreflector 25, located at remote terminal 10, to the receiver at terminal 12 and is used to generate a control signal for the beam steering element 18 to insure that the transmitted signal from terminal 12 is being directed to terminal 10.

Figure 2:
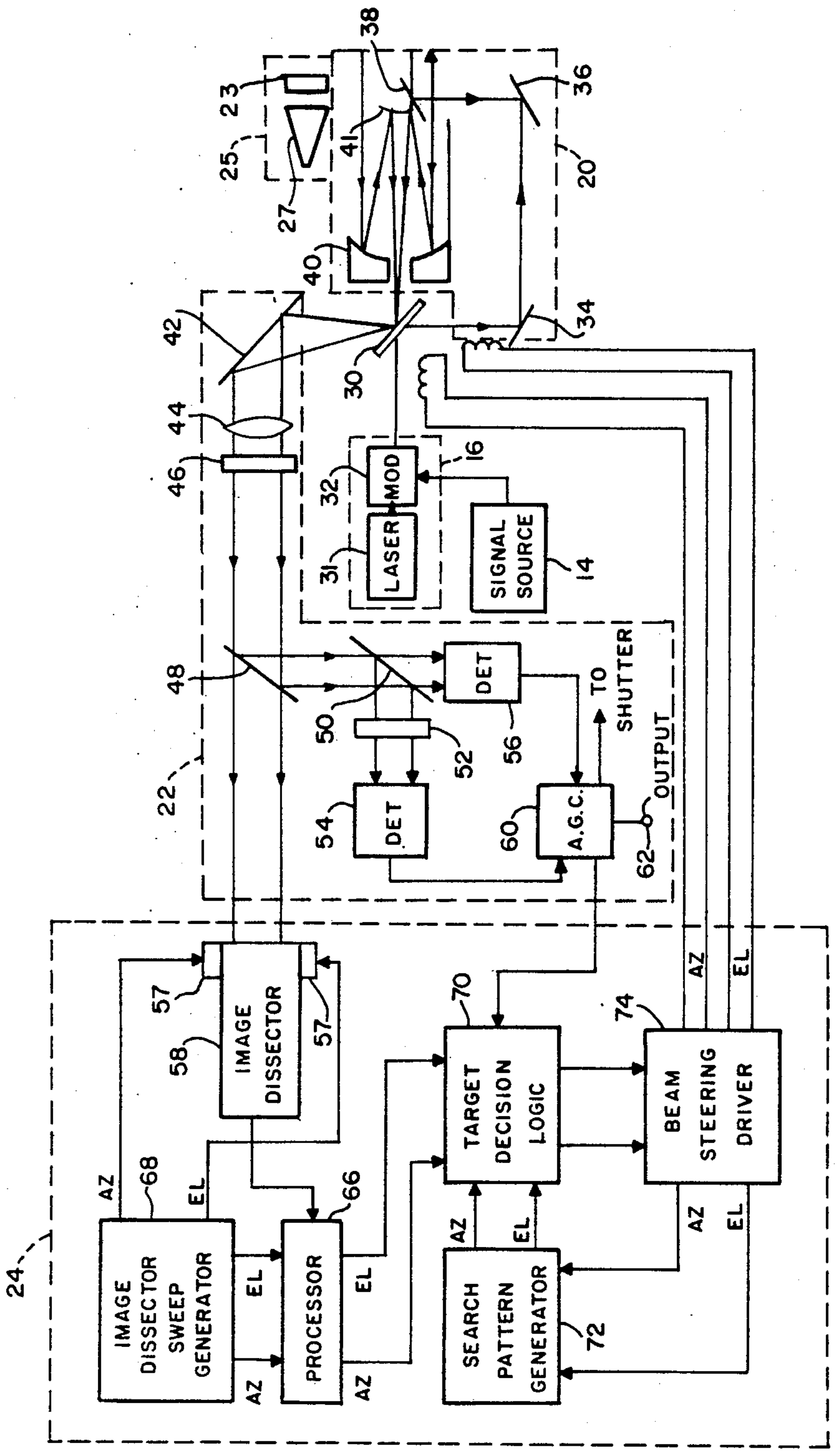
FIG. 2 is a detailed block diagram of an embodiment of the invention.

Details of a preferred embodiment of the invention are shown in FIG. 2. Transmitter unit 16 employs a modulator 32 typically a polarization modulator having one input connection from a laser 31 and a second input connection from a conventional signal source 14. Beam steering element 30, typically a two-sided mirror, has one input optically connected to the output of modulator 16 and its corresponding output beam connected through a plurality of mirrors 34, 36 and 38 in a light transmitting arrangement to the companion terminal.

The receiver 20 includes a parabolic collecting lens 40 and a convex reflector 41 which together form a receiver telescope, typically a 15 inch, *f*/8 Schmidt-Cassagrain optical system with an effective focal length of 1 meter. The receiver optical path from the beam steering mirror 30, located at the focal point of the receiver telescope, includes a mirror 42; beam forming lens 44, typically a duoconvex lens; an interference filter 46, typically 20 A. in bandwidth, beam splitters 48 and 50; an analyzer 52, detectors 54 and 56, typically photomultipliers, and a search and track unit 24 to be discussed in detail hereinafter.

In operation, a signal received from the remote terminal is collected by collecting mirror 40 and focused at the beam steering mirror 30 by the combined action of mirrors 40 and 42. Received rays from the mirror 30 are directed via a diagonal mirror 42 to beam forming lens 44, for collimation prior to passing through the interference filter 46 which provides discrimination between the laser signal and scattered sunlight background noise. At beam splitter 48, a portion of the received energy, typically 10 percent, is directed to the search and track unit 24 to generate control information for the mirror 30 while the remainder of the signal is directed to a second beam splitter 50.

The optical receiver 22 has first and second detector channels, the first of which includes the series combination of analyzer 52 and detector 54 and the second of which includes detector 56. The transmitted signal from the remote station is polarization modulated and consequently a polarization analyzer 52 is placed in front of the detector 54, typically a photomultiplier, to demodulate the signal. The second channel does not detect the modulation but only intensity fluctuations, for example, resulting from the atmosphere. The output signals from detectors 54 and 56 are directed to an AGC circuit 60, typically a single alloy junction, bilateral transistor which performs a division of the two signals thus normalizing the demodulated signal at the receiver output 62 by removing intensity fluctuation.

Search and Track Unit

Search and track unit 24, which contains the control and driving circuitry for the beam steering mirror 30, includes an image dissector 58, with input connections from beam splitter 48 as described hereinabove, and from an image dissector sweep generator 68, typically a triangular wave generator. A signal processor 66, to be discussed hereinafter, having inputs from the image dissector 58 and the sweep generator 68 has an output connection to a target decision logic 70, also to be discussed hereinafter. The target decision logic 70 has additional input connections from a search pattern generator 72 and from the AGC 60 and an output connection to a beam steering driver 74, typically a current driver. In operation, a portion of the received signal is directed by beam splitter 48 to the face of an image dissector tube 58. The image dissector beam is swept in a conical scan fashion by the application of a pair of orthogonally related signals to deflection plates 57 from the image dissector sweep generator 58. FIGS. 3A through 3D show the dissector light input and output electrical signals for two cases, namely, when the center of the received signal coincides with the center of the conical scan search pattern and when the two above-mentioned centers do not coincide.

Figures 3, 3A, 3B, 3C, 3D:
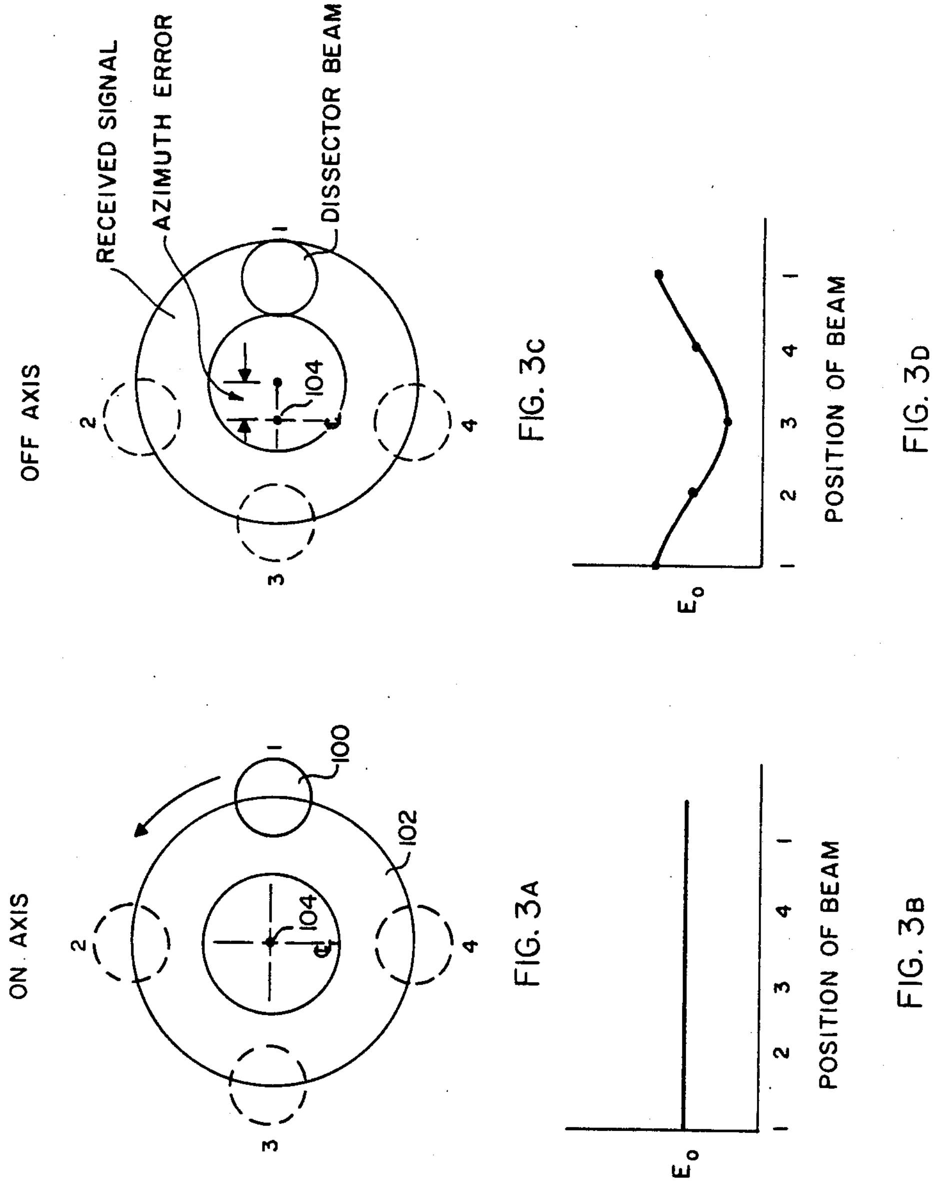
FIGS. 3A through 3D are diagrammatic representations of input and output signals occurring at an image dissector as disclosed in FIG. 2.

While the dissector beam 100 scans continuously about the center point 104, FIG. 3A shows the beam 100 in four discrete positions and FIG. 3B illustrates the corresponding dissector output signal. The received signal 104 appears as an annulus on the face of the dissector because of the aperture blocking of receiving lens 42. When the beam steering mirror 30 is positioned such that the centers of the received signal 102 and image dissector scan are coincident, the center of the image beam 100 scans the circumference of the received signal 102 resulting in a constant output signal $E_0$ from the image dissector.

When the beam steering element 30 is positioned such that the centers of the received signal 102 and the dissector scan are not coincident, as for example the case of an azimuth error depicted in FIG. 3C, the center of the image dissector beam 100 no longer scans the circumference of the received signal. FIG. 3D shows the corresponding image dissector output signal as a function of dissector beam position. The signal thus generated is directed to the processor 66 where it is transformed into an error signal, the amplitude and phase of which represent the magnitude and direction, respectively, of the misalignment between terminals. The error signal is then directed through the target decision logic 70 to the beam steering mirror driver 74 which in turn drives mirror 30 to a position such that the centers of the received signal and the image dissector scan are again concentric.

As stated hereinabove, the beam steering mirror is under the control of one of three possible signals, namely, a signal received from the companion terminal transmitter, or signal reflected from the retroreflector of the companion terminal or in the absence of either of the above two signals a signal from the search pattern generator 72. The target decision logic 70 establishes the priority and control for mirror 30 based upon the strength of the received signal.

Mirror Control Circuitry

Figure 4:
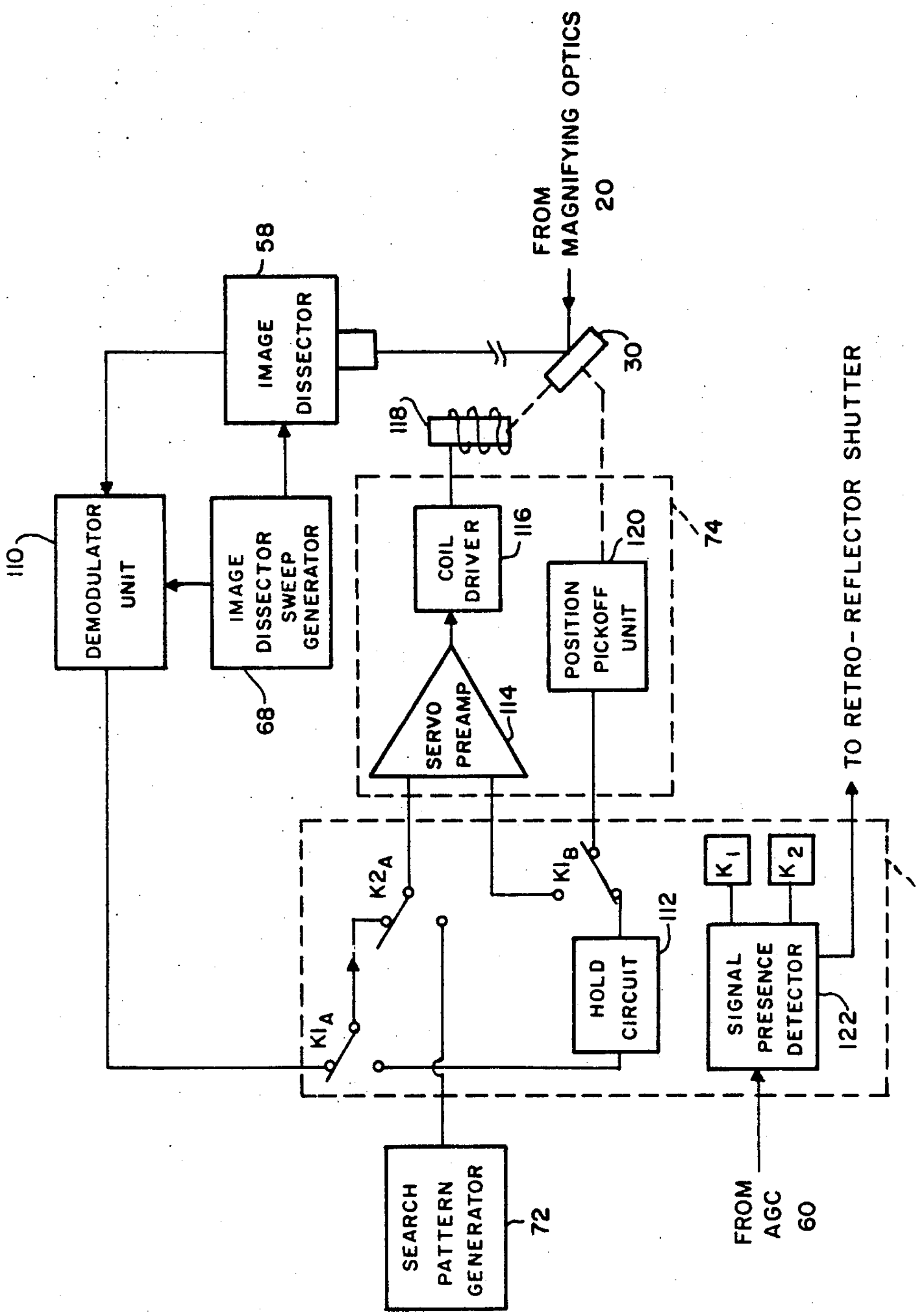
FIG. 4 is a block diagram of the mirror control system employed in the present invention.

FIG. 4 is a block diagram of the control circuitry employed within the search and track unit 24 of FIG. 2 to position the mirror 30. A demodulator 110, typically a phase demodulator, has input connections from image dissector 58 and sweep generator 68 and an output connection through a pair of series connected switch contacts $K1_A$ and $K2_A$, typically relay contacts or semiconductor switches, to a servopreamplifier 114.

A coil driver 116, having input connection from the servopreamplifier 114, is connected to the mirror positioning coils 118. A hold circuit 112, typically an integrator, has an input connection through a contact $K1_B$ to a position pickoff unit 120 discussed hereinafter, and an output connection through the series connected contacts $K1_A$ and $K2_A$ to servopreamplifier 114. Switches $K_1$ and $K_2$ are controlled by a signal from the signal presence detector 122 typically a thresholding circuit.

In operation, a received signal from the magnifying optics 20 is directed from beam steering mirror 30 to the image dissector 50. An error signal, with an amplitude proportional to the misalignment between the received signal and the mirror 30 and with a phase indicating the direction of misalignment is generated by combining the image dissector output signal and image dissector sweep signal in the phase demodulator 110. The error signal is directed through contacts $K1_A$ and $K2_A$, servopreamplifier 114 and coil driver 116 to the mirror positioning coils 118 which position the mirror in a direction to eliminate the error signal.

The positions of the contacts of switches K1 and K2 are shown for the track mode of operation. As long as a received signal is present at the signal presence detector 122, contacts $K_{1A}$, $K_{1B}$ and $K_{2A}$ will be held in the position shown in FIG. 4 and a shutter 23 will be maintained over a corner reflector 27 to prevent cross-talk between a received message and reflected transmitted energy. If a loss of signal occurs at the signal presence detector 122, the retroreflector is unblocked and contacts $K1_A$ and $K1_B$ are changed such that the output of the hold circuit 112 is directed through contact $K2_A$ to the servopreamplifier 114. Hold circuit 112 has an output signal proportional to the steering mirror position which is sensed by the position pickoff unit 120, typically optical sensors arranged in a bridge configuration. The hold circuit signal holds the mirror for a preset time, typically 10 seconds, in the position it last received a signal form the companion terminal. If the received signal has not been detected at the signal presence detector 122 within the 10 seconds, switch K 2 is switched such that the mirror servosystem is driven by a signal from the search pattern generator 72. The mirror 30 is scanned until a signal form either the retroreflector or transmitter of the companion terminal is acquired and sensed by signal presence detector 122 at which time the contacts of switches $K_1$ and $K_2$ will be returned to the positions shown in FIG. 4 disconnecting the search pattern generator 72 and hold circuit 112 from the servoloop.

Although the invention has been described with reference to the specifics of one illustrative embodiment, it is not limited to the details of this description but embraces the full scope of the following claims.

We claim:

1. A laser communication system having first and second terminals remotely located from each other, said first terminal comprising:

a transmitter means operative in response to a signal from a signal source to generate a modulated light beam;

a beam steering means operative to simultaneously control the direction of the modulated light beam from said transmitter means and a received light beam from said second terminal and operative to maintain isolation between said beams;

an optical directing means operative to direct the light beam received from said second terminal to said beam steering means;

an optical receiver operative to detect and demodulate the received beam directed from said beam steering means; and a tracking means operative in response to a portion of said received beam to direct said beam steering means to a position producing a maximum signal at said optical receiver.

2. The invention according to claim 1 further including a retroreflector located at said second terminal operative to reflect a portion of the transmitted light beam back to said first terminal in the absence of a received light beam from said second terminal.

3. The invention according to claim 1 wherein:

said transmitter means includes a laser transmitter operative to generate a coherent light beam; and a modulator means operative in response to a signal from a signal source to polarization modulate said light beam.

4. The invention according to claim 3 wherein said beam steering means comprises; an element having mirror surfaces on two sides, one side being operative to control the direction of the light beam from said transmitter means and the second side being operative to control the direction of the received light beam from said optical directing means.

5. The invention according to claim 4 wherein said optical directing means comprises a telescope and wherein said optical comprises:

a beam forming lens operative to control the diameter of the received beam directed from said beam steering means;

first and second beam splitters wherein said first beam splitter is operative to divide the light beam from said beam forming lens between said second beam splitter and said tracking means;

an optical analyzer operative in response to the received light beam from said second beam splitter to demodulate said modulated light beam;

first and second detectors operative in response to the light beams from said second beam splitter to produce electrical signals proportional to light intensity; and an automatic gain circuit operative to normalize said electrical signals by dividing the output signal of said second detector by the output signal of said first detector.

6. The invention according to claim 5 wherein said tracking means includes:

an image dissector operative to generate an electrical signal in response to a misalignment between said portion of said received beam and a scan beam generated within said image dissector;

processor means operative to convert the electrical signal from said image dissector to a control signal indicative of said misalignment; and driving means operative in response to a control signal to control the position of said beam steering means.

7. The invention according to claim 6 further including a search means operative to generate a preset control signal and a target decision means operative to connect the output signal from said search means to said driving means in the absence of a control signal from said image dissector whereby said driving means in response to said preset control signal is operative to drive said beam steering means in a preset scan pattern.